United States Patent [19]
Plamp et al.

[11] Patent Number: 5,255,170
[45] Date of Patent: Oct. 19, 1993

[54] ILLUMINATED MEMORIAL

[75] Inventors: Diann F. Plamp, Mitchell; LaDell R. Swiden, Brookings, both of S. Dak.

[73] Assignee: Cemeteries Aglow, Inc., Mitchell, S. Dak.

[21] Appl. No.: 991,167

[22] Filed: Dec. 16, 1992

Related U.S. Application Data

[63] Continuation of Ser. No. 792,549, Nov. 15, 1991, abandoned.

[51] Int. Cl.⁵ .................................................. F21L 9/00
[52] U.S. Cl. ..................................... 362/183; 362/121; 362/269; 362/285; 362/808
[58] Field of Search .............. 362/121, 183, 184, 123, 362/806, 807, 808, 810, 250, 252, 269, 285, 287, 311; 323/906

[56] References Cited

U.S. PATENT DOCUMENTS

| | | | |
|---|---|---|---|
| 4,319,310 | 3/1982 | Kingsley | 362/183 |
| 4,384,317 | 5/1983 | Stackpole | 362/183 |
| 4,441,143 | 4/1984 | Richardson, Jr. | 362/183 |
| 4,486,820 | 12/1984 | Baba et al. | 362/183 |
| 5,013,972 | 5/1991 | Malkieli et al. | 362/183 |
| 5,065,289 | 11/1991 | Teng | 362/269 |

Primary Examiner—Albert J. Makay
Assistant Examiner—Alan B. Cariaso
Attorney, Agent, or Firm—Allegretti & Witcoff, Ltd.

[57] ABSTRACT

A memorial comprising a three dimensional monument member having a configuration and first surface conforming to said configuration, an illuminating means, coupled to a first surface of said monument member, for illuminating said monument, said illuminating means including a plurality of light sources arranged on said first surface to substantially conform to said configuration. The memorial further includes power means, electrically coupled to said illumination means, for providing said electrical power, and control means, electrically coupled to said illumination means and said power means, for responsively coupling said electrical power to said illuminating means and wherein said plurality of light sources, when illuminated, radiate outward appearing as illuminating star-like light sources.

6 Claims, 3 Drawing Sheets

ILLUMINATED MEMORIAL

This is a continuation of application Ser. No. 07/792,549, filed Nov. 11, 1991, abandoned.

BACKGROUND OF THE INVENTION

The present invention relates generally to memorials and more particularly to an illuminated memorial in remembrance of a lost loved one.

Illuminated memorials are often used to mourn a death, personalize a burial site, bring a family together, symbolize the everlasting nature of life, and/or perform a religious function or service. These type of memorials are often placed on or near the burial site.

Illuminated memorials provide a warm glow at night. The warm glow brings a sense of warmth to the those mourning the loss while providing a comforting feeling to all.

Illuminated memorials tend to bring the family closer at a difficult time. They produce images of everlasting life, images that provide comfort to the family and others who are mourning the loss of a loved one. Illuminated memorials symbolize the everlasting and perpetual being of life; providing a warm comforting feeling of remembrance through the continual being of life.

SUMMARY OF THE INVENTION

In a first principal aspect, the present invention is an illuminated solar-powered memorial. The memorial includes a monument, an illuminating system within the monument, a power system and a control mechanism.

The monument has a traditional configuration, such as a cross. The illuminating system includes a plurality of light sources arranged in substantial conformance with the monument configuration. When illuminated, the light sources appear, at a distance, as point sources depicting the monument configuration.

The power system is electrically coupled to the illumination system by the control mechanism under predetermined conditions. The power system includes a rechargeable battery and an energizing subsystem for charging the battery in response to sunlight. The control mechanism activates the illumination system at dusk, based upon a darkness threshold.

In a second principal aspect, the control mechanism includes a timing circuit. Under operation, the control mechanism deactivates the illumination system in the late night, based upon the lapsing of a predetermined time period thereby preserving battery life.

In a third principal aspect of the invention the control mechanism includes a shadow detection mechanism for responsively decoupling the power system from the illumination system after detecting a temporary shadow.

It is thus the object of the present invention to provide an illuminated memorial in remembrance of a family member or friend. Another object is an illuminated solar-powered memorial. Still another object of the present invention is a long-lasting illuminated memorial requiring minimal maintenance.

This and other features, objects and advantages of the present invention are described or implicit in the following detailed description of various preferred embodiments.

BRIEF DESCRIPTION OF THE DRAWINGS

In the course of the detailed description of preferred embodiments to follow, reference will be made to the attached drawings, in which.

DESCRIPTION OF PREFERRED EMBODIMENTS

Figure 1:
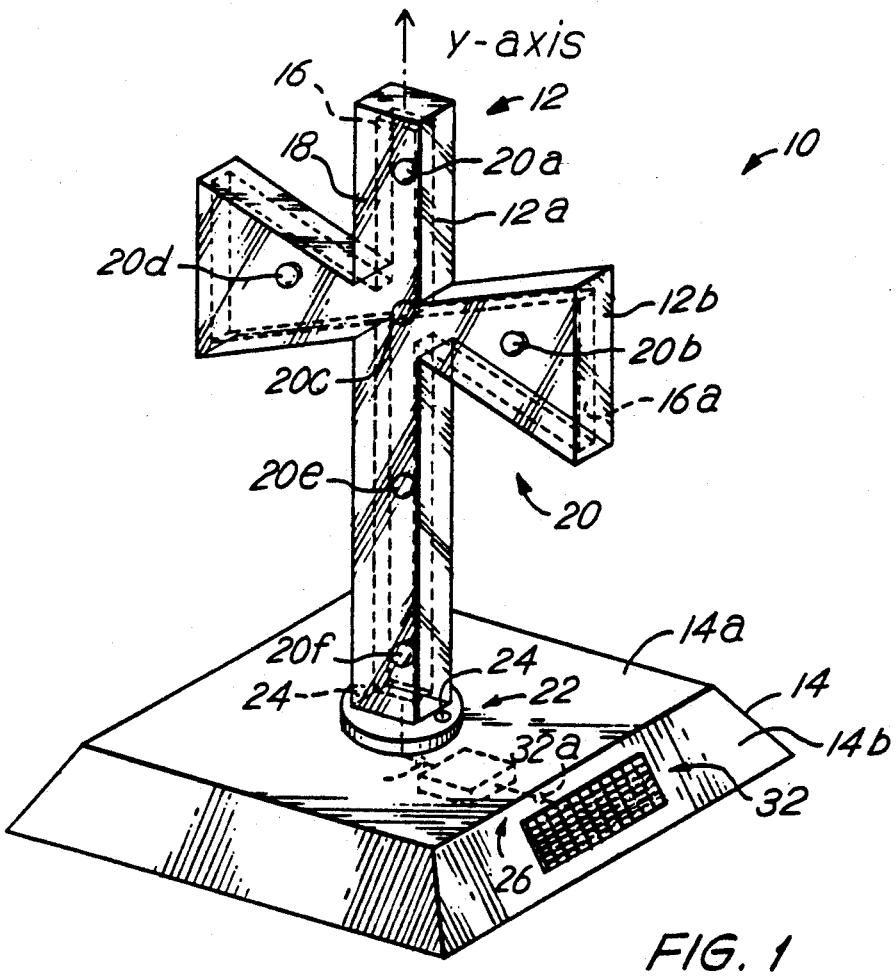
FIG. 1 is a perspective view of an embodiment of a memorial including a monument member according to the present invention.

A memorial 10 according to the present invention is illustrated in FIG. 1. The memorial 10 includes a monument member 12 and a base member 14. The base member 14 supports the monument member 12 in a substantially vertical position with respect to a surface 14a of the base member 14.

The monument member 12 includes members 12a and 12b intersecting as shown. The monument member 12, in the illustrated embodiment, is configured to appear much like a cross. Members 12a and 12b have substantially perpendicular longitudinal axes. The monument member 12, although described as including the members 12a and 12b, may be configured from a unitary member shaped accordingly.

The monument member 12 may take many types of configurations or shapes. As mentioned above, in the illustrated embodiment, the configuration of the monument member 12 is much like a cross. The monument member 12 may take other types of shapes or configurations. For example, the monument member 12 may be shaped or configured like other types of religious symbols.

The monument member 12 includes an inner member 16. The shape or configuration of the inner member 16 substantially corresponds to the configuration of the monument member 12.

The inner member 16 includes an outer surface 16a. The shape or configuration of the surface 16a substantially corresponds to the configuration of the monument member 12 and the inner member 16.

The monument member 12 further includes an overlying translucent material 18. The translucent material 18 is fixedly coupled to the outer surfaces of the inner member 16. The translucent material 18 encapsulates the inner member 16. The translucent material 18 may be substantially clear type material or may be a color or diffusing type material. The translucent material 18 may also include a combination of the substantially clear type material and color or diffusing type material. In a preferred embodiment, the translucent material 18 is a type of Lucite manufactured by Crystal-Like Plastic.

The memorial 10 further includes a rotating member 22 and a rotation securing mechanism 24. The rotating member 22 engages the monument member 12 and the surface 14a of the base member 14. The rotating member 22 pivotally couples the monument member 12 to the base member 14. The rotating member 22 permits the monument member 12 to rotate about its longitudinal axis, the Y-axis, having a range of motion of 360 degrees. As a result, monument member 12 may rotate to face any direction irrespective of the position of the base member 14. It should be noted that the rotating member 22 may include an "o-ring" to enhance the weatherproofing of the memorial 10.

Another but related advantage of the rotating member 22 is the ability to position the base member 14 so that the surface 14b is facing toward the sun during its inclination while having the monument member 12 freely rotatable. A solar energizing means 32, for example a solar panel, is secured to the surface 14b of the base member 14. The rotatable member 22 permits the positioning of the base member 14, and in particular surface 14b, in a direction which permits the solar energizing means 32 to be situated in a somewhat direct path of the sun's radiation. For example, in the northern hemisphere, a southern exposure of the surface 14b translates into the solar energizing means 32 being positioned in a somewhat direct path of the sun's radiation during its inclination. Positioning the solar energizing means 32 to face south facilitates its generation of a greater amount of energy. The significance of this advantage will become apparent from the discussion below.

The memorial 10 employs the rotation securing mechanism 24 to secure the monument member 12 in a fixed position relative to its longitudinal axis. The rotation securing mechanism 24 engages the surface 14a of the base member 14 and the rotating member 22. In one embodiment, the rotation securing mechanism 24 may be two screws that engage both the base member 14 and the rotating member 22 to frictionally resist the rotation of the monument member 12. In another embodiment, the rotation securing mechanism 24 may also include a securing plate having two holes to engage the two screws. The securing plate is located within the base member 14 so that the two screws and the securing plate would "sandwich" the surface 14a and the rotating member 22 to resist any relative movement.

The monument 12 further includes a control and power unit 26 and an illumination unit 20. The control and power unit 26 provides electrical power to the illumination unit 20. The control and power unit 26 communicates with the illumination unit 20 over multi-conductors 26a. The illumination unit 20 is discussed in detail immediately below.

The illumination unit 20 includes light sources 20a-f which may be, for example, light emitting diodes (LED(s)). The light sources 20a-f are positioned on the surface 16a of the inner member 16 of the monument member 12. The light sources 20a-f may be arranged on the surface 16a in a configuration that conforms substantially to the configuration or shape of the monument member 12 and the inner member 16.

In a preferred embodiment, the light sources 20a-f are arranged uniformly on the surface 16a of the monument member 12 conforming to the configuration of the monument member 12 such that the light sources 20a-f radiate outwardly appearing as illuminating points of light or star-like light sources. In one embodiment, the monument 12, the light sources 20a-f, and the translucent material 18 cooperate to define a means for providing a substantially glowing memorial 10 when the light sources 20a-f are illuminated.

In another preferred embodiment, the light sources 20a-f, when illuminated, radiate outwardly forming a chain of illuminating points of light or star-like light sources having a configuration substantially similar to the configuration of the monument member 12. The monument 12, the configuration of the monument 12, the light sources 20a-f and the configuration thereof, and the translucent material 18, in one embodiment, cooperate to define a means for providing a substantially glowing memorial 10 when the light sources 20a-f are illuminated.

Figure 2A:
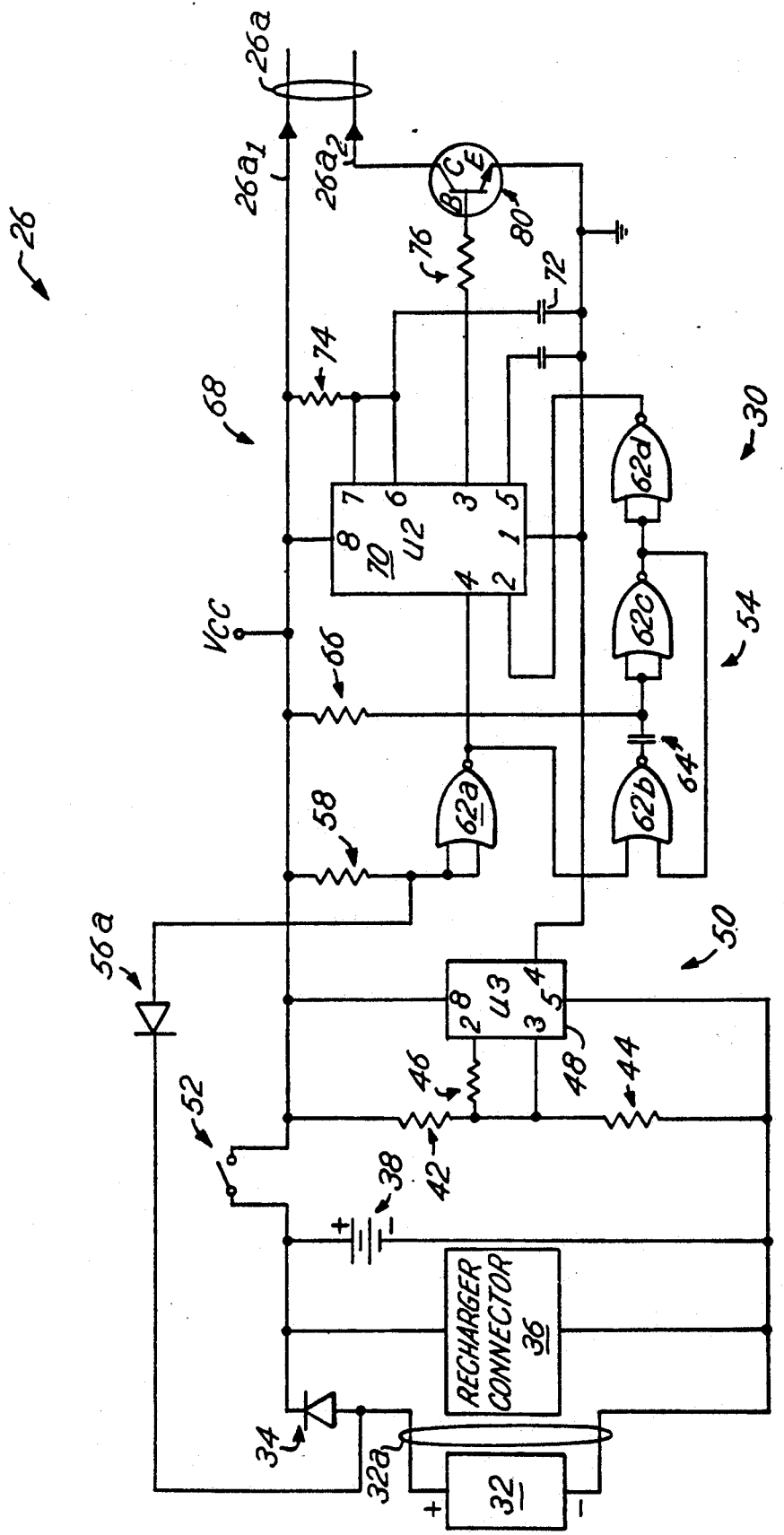
FIGS. 2A and 2B are detailed schematics of preferred embodiments of a power and control unit of the memorial of FIG. 1.

With reference to FIG. 2A, the control and power unit 26 includes power unit 28 and a control unit 30. Briefly, the power unit 28 is employed to provide electrical power to the control unit 30. In addition, the power unit 28 responsively provides power to the illumination unit 20. The power unit 28 employs a battery 38 as a primary source of the electrical power. A solar energizing means 32 periodically charges or recharges the battery 38.

With continued reference to FIG. 2, the power unit 28, in a preferred embodiment, includes solar energizing means 32, a diode 34, the battery 38, a low voltage detection unit 50, and a switch 52. These elements are interconnected as illustrated.

The solar energizing means 32, in a preferred embodiment, is a solar panel. The solar energizing means 32 is designed to generate electrical power in response to illumination, for example, radiation from the sun, and charge or recharge the battery 38. The solar energizing means 32 communicates with the various elements of the power unit 28 over multi-conductors 32a. The solar energizing means 32 is positioned on a surface 14b of the base member 14. In a preferred embodiment, the solar energizing means 32 is a 1.1 watt solar panel available from Applied Energy Technology of Swisher, IA.

The battery 38 is employed as the primary source of electrical power for the illumination unit 20. The battery 38 also provides electrical power to the various elements of the control unit 30. In a preferred embodiment, the battery 38 is a 6 volt 4.6 ampere hour battery power source manufactured by Eagle Picher Inc.

The diode 34 is designed to reduce reverse current leakage. The diode 34, when reversed biased, appears as an open thereby minimizing current flow from the battery 38 to the solar energizing means 32. The diode 34 is reversed biased when the electrical potential at the positive terminal of the solar energizing means 32 is below the potential at the positive terminal of the battery 38. Generally this occurs when the sun's radiation is insufficient to generate a sufficient voltage across the positive and negative terminals of the solar energizing means 32.

In operation, the diode 34 is forward biased when the solar energizing means 32 is charging the battery 38 (i.e. the voltage across the terminal of the solar energizing means 32 is greater the voltage across the terminals of the battery 38). The diode 34, when forward biased, appears as a short. When the diode 34 is reversed biased (i.e. the voltage across the terminal of the solar energizing means 32 is less than the voltage across the terminals of the battery 38) the diode 34 appears as an open thereby preventing the battery 38 from discharging into the solar energizing means 32. In the reversed biased state, the diode 34 in effect decouples the positive terminals of the solar energizing means 32 and the battery 38. In a preferred embodiment, the diode 34 is a type 1N5818 Schottky Rectifier diode, available from Motorola Corporation.

The memorial 10 may also include a recharger connector 36 to facilitate the use of an external electrical power source to charge or recharge the battery 38 or to provide a primary source of electrical power to the memorial 10. The external electrical power source is coupled in parallel with the battery 38 and thereby externally recharges the battery 38.

An electrical power source connected to the recharger connector 36 may also be employed to power the memorial 10 as well. The recharger connector 36 may be the primary source of electrical power for the illumination unit 20 and the control unit 30. In a preferred embodiment, the recharger connector 36 is a type 3.5 mm phone jack.

The switch 52 is designed to allow the user to manually deactuate the memorial 10. The switch 52 couples or decouples the power unit 28 to or from, respectively, the illumination unit 20 and the control unit 30. In operation, the switch 52 is placed in the closed state thereby coupling the positive terminal of the battery 38 to the remaining portion of the power unit 28. In a preferred embodiment, the switch 52 is a magnetic reed type switch.

The low voltage detection unit 50 is employed to prevent the battery 38 from being drained to a level that may damage the battery 38. The low voltage detection unit 50 includes voltage detector 48, and the resistors 42, 44, and 46. The voltage detector 48 and the resistors 42, 44, and 46 are designed to couple or decouple the battery 38 to or from, respectively, the control unit 30 and the illumination unit 20 when the battery's voltage is below a low voltage threshold.

In a preferred embodiment, the voltage detector 48 and the resistors 42, 44, and 46 are configured and selected to decouple the battery 38 when the voltage of the battery 38 is below about 5.8 volts. When the low voltage detection unit 50 decouples the battery 38, the current drain on the battery 38 is reduced to several microamperes. This insures the battery 38 is not drained to a level that would cause damage.

It should be noted that the low voltage detection unit 50, in the illustrated configuration, includes hysteresis feedback. This feedback, in a preferred embodiment, is designed to maintain the battery 38 in a decoupled state until the voltage of the battery 38 rises to a level of about 6.2 volts. The resistance value of the resistor 46 determines the amount of hysteresis incorporated within the low voltage detection unit 50.

In a preferred embodiment, the resistors 42, 44, and 46 have a resistance of about 84.5K ohms, 20K ohms, and 1.8M ohms, respectively. The voltage detector 48 is a type ICL 8212, manufactured by Harris Corporation. The pin numbers of voltage detector 48, indicated within its functional block, are consistent with a type ICL 8212 device.

The control unit 30 is designed to responsively couple the power unit 28 to the illumination unit 20 and thereby illuminate the light sources 20a–f of the illumination unit 20. Briefly, the control unit 30 is responsive to the illumination existing in the environment in which the memorial 10 resides. The control unit 30 senses the amount of illumination, and, when a predetermined darkness threshold is attained, couples the power unit 28 to the illumination unit 20.

The control unit 30, in a preferred embodiment, uncouples the power unit 28 from the illumination unit 20 after a predetermined time period. The control unit 30 monitors and controls the duration of the illumination period of the illumination unit 20. Once the predetermined time period expires, the control unit 30 uncouples the power unit 28 from the illumination unit 20.

With reference to FIG. 2A, the control unit 30, in a preferred embodiment, includes illumination detection unit 54, timing unit 68, and transistor 80. A detailed discussion of the operation of the control unit 30 follows the brief discussion of the elements of the control unit 30, immediately below.

The illumination detection unit 54 is designed to electrically detect a reduction in the sun's radiation as measured by the solar energizing means 32. In response, the illumination detection unit 54 initiates the illumination process. The illumination detection unit 54, in this embodiment, includes a diode 56a, resistors 58 and 66, capacitor 64, and NOR logic gates 62a–d. The diode 56a and the resistor 58 are configured, along with the NOR logic gate 62a, to detect and respond to a drop in the voltage at the positive terminal of the solar energizing means 32. A reduction in voltage at the positive terminal of the solar energizing means 32 indicates a reduction of the sun's radiation measured by the solar energizing means 32. When a darkness threshold is met, the illumination detection unit 54 initiates the process of coupling the power unit 28 to the illumination unit 20. The darkness threshold is discussed in detail below.

The NOR logic gates 62a–d, the capacitor 64, and the resistor 66 are employed to responsively generate the reset and trigger signals for the timing unit 68. The output of the NOR logic gate 62a is utilized as the reset signal for the timing unit 68. The capacitor 64, the resistor 66, and the NOR logic gates 62b and 62c form a monostable multivibrator whose output pulse is used as the trigger signal for the timing unit 68. The NOR logic gate 62d provides a signal inversion of this output pulse prior to application to the trigger input of the timer 70.

The timing unit 68 includes the timer 70, a capacitor 72, and a resistor 74. The timer 70, the capacitor 72, and the resistor 74 are configured in a monostable operation. The values of the capacitor 72 and the resistor 74 determine the duration of the output pulse of the timer 70.

The operation of the control unit 30 is described below for a timer 70 of the type IM555 monolithic timer. The operation is first described at the transition from light to dark. That is to say, when the control unit 30 senses a sufficient reduction in the sun's radiation which results in coupling electrical power to the illumination unit 20.

Briefly, in operation, the control unit 30 couples the power unit 28 to the illumination unit 20 when the illumination detection unit 54 detects the darkness threshold has been attained. This occurs when the voltage at the positive terminal of the solar energizing means 32 is less than the voltage at the positive terminal of the battery 38. Under these conditions, the diode 56a is forward biased.

As the diode 56a becomes increasingly forward biased, its resistance decreases. As a result, the inputs of the NOR logic gate 62a are pulled to a low logic level. In response, the output of the NOR logic gate 62a changes from a low logic level to a high logic level. The output of the NOR logic gate 62a is coupled to the reset input, pin 4, of the timer 70. The reset input of the timer 70 receives the high logic level thereby allowing the timer 70 to respond to the trigger signal subsequently applied to its trigger input.

The output of the NOR logic gate 62a is also coupled to an input of the NOR logic gate 62b. In response to the low to high transition at the output of the NOR logic gate 62a, the output of the NOR logic gate 62b changes from high to low. When the output of the NOR logic gate 62b is forced low, the capacitor 64 begins to charge from its initially discharged state. Extending into a portion of the charging interval of the capacitor 64, both inputs of the NOR logic gate 62c are at a low logic level. This causes the output of the NOR logic gate 62c to toggle from low to high.

The NOR logic gate 62d receives the high logic level at both its inputs and supplies a logic low to the trigger input, pin 2, of the timer 70. The timing unit 68 has now been triggered and the output of the timer 70, pin 3, provides a base current to the transistor 80, through resistor 76. In response, the transistor 80 turns "on".

The inputs of the NOR logic gate 62c remain low during a portion of the charging time of the capacitor 64. Once the capacitor 64 has charged to approximately 1.5 volts, the output of the NOR logic gate 62c toggles from high to low. In response, the output of the NOR logic gate 62d toggles high thereby completing the trigger pulse.

The pulse width of the trigger pulse is primarily dependent upon the capacitance value of the capacitor 64 and the resistance value of the resistor 66. In a preferred embodiment, the pulse width of the trigger pulse is about 100 milliseconds. Under these circumstances, the resistance value of the resistor 66 is about 1M ohm and the capacitance value of the capacitor 64 is about 0.01 microfarad.

The transistor 80 is essentially an electrically controlled switch. When the transistor 80 is "on", conductor 26a is coupled to ground thereby creating a closed circuit for the illumination unit 18. In response, the light sources 20a-f illuminate. When, however, the transistor 80 is "off", conductor $26a_2$ is not coupled to ground, a return path is not provided, and the light sources 20a-f do not illuminate.

The values of the capacitor 72 and the resistor 74 determine the duration of illumination. That is to say, the capacitor 72 and the resistor 74 determine the amount of time a base current is supplied to the transistor 80 and therefore the amount of time the illumination unit 20 remains illuminated. The capacitance of capacitor 72 and the resistance of the resistor 74 form the RC time constant for the charging of the capacitor 72. When the charge on the capacitor 72 is approximately two-thirds of $V_{cc}$, the output of the timer 70 goes low and the capacitor 72 discharges to ground. When the output of the timer 70 is low, the transistor 80 is cut-off thereby turning off the illumination unit 20.

In a preferred embodiment, the resistor 74 has a resistance of about 4.7M ohms and the capacitor 72 has a capacitance of about 4700 microfarads. Under those conditions, the illumination unit 20 remains illuminated for about 6 hours. It should be noted that this time may be increased or decreased as desired.

Generally, since the nighttime exceeds 3 hours, the light sources 20a-f are not illuminated when the illumination detection unit 54 senses an increase in the radiation of the sun with the onset of sunrise. In those instances where the illumination of the light sources 20a-f exceeds the period of darkness, the control unit 30 is employed to decouple the power unit 28 from the illumination unit 20 during the onset of daylight. The control unit 30 utilizes the illumination detection unit 54 to generate a reset signal which causes the timer 70, of the timing unit 68, to decouple the power unit 28 from the illumination unit 20.

In operation, as the sun's radiation increases, the NOR logic gate 62a responds to the increasing resistance of the diode 56a as it becomes reversed biased. In response, a logic high level is sensed by the inputs of the NOR logic gate 62a. A logic high level at the inputs of the NOR logic gate 62a causes its output to go low. The transition of the reset signal from high to low causes the timer 70 to reset. When the timer 70 resets its output is forced low. In response, the transistor 80 is cut-off thereby turning off the illumination unit 20.

The darkness threshold is attained when the voltage at the inputs of the NOR logic gate 62a causes the output of the NOR logic gate 62a to toggle from low to high. This initiates the illumination process by initiating the generation of the reset and trigger signals by the illumination detection unit 54. A voltage divider of the solar energizing means 32, the diode 56a, and the resistor 58 dictates when the darkness threshold is met. The resistance of the diode 56a decreases at the transition from light to dark. The decrease in the resistance of the diode 56a results in an decrease in the voltage at the input of the NOR logic gate 62a. The darkness threshold is met when the input of the NOR logic gate 62a is pulled low. The output of the NOR logic gate 62a responsively changes from low to high. This initiates the illumination process.

In a preferred embodiment, the output of the NOR logic gate 62a changes from low to high when the voltage at the inputs of the NOR logic gate 62a is approximately 25% of $V_{cc}$ or at about 1.5 volts. The resistor 58, in a preferred embodiment, has a resistance value of about 470K ohms and the solar energizing means 32 has a nominal resistance of about 50K ohms.

It should be noted that the resistor 58 may be replaced by a potentiometer which facilitates the modification of the threshold. Since the resistance introduced by the potentiometer may be adjusted, the darkness threshold may be adjusted.

The illumination detection unit 54 also includes a shadow detection means. In the event a temporary shadow develops on the solar energizing means 32, the control unit 30 couples the power unit 28 to the illumination unit 20 if the darkness threshold is met. When the shadow moves off the solar energizing means 32, the control unit 30, via the shadow detection means, responds by turning the illumination unit 20 off.

In operation, as the sun's radiation decreases due to the shadow, the control unit 30, as described above, responds by coupling the power unit 28 to the illumination unit 20. A shadow on the solar energizing means 32 causes the control unit 30 to illuminate the light sources 20a-f when the darkness threshold is met. As the shadow "moves" off the solar energizing means 32, the resistance of the diode 56a increases. In response, a high logic level is sensed by the inputs of the NOR logic gate 62a. A logic high level at the inputs of the NOR logic gate 62a causes its output to toggle low. The transition of the reset signal from high to low causes the timer 70 to reset. When the timer 70 resets, its output is forced low regardless of the logic level at the trigger input of the timer 70. In response, the transistor 80 is cut-off thereby turning off the illumination unit 20.

Figure 2B:
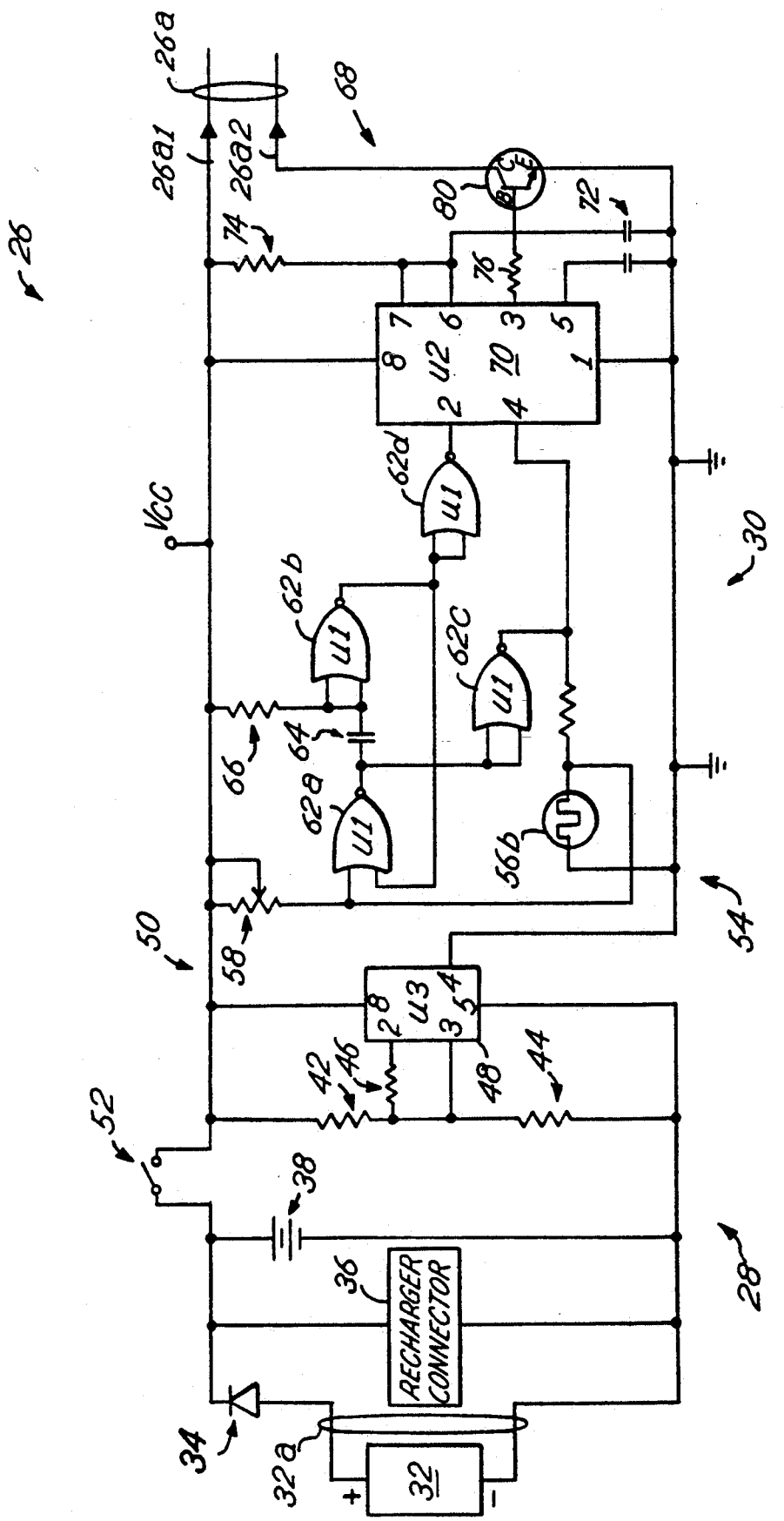

Referring now to FIG. 2B, in another preferred embodiment, control and power unit 26 includes a power unit 28 and a control unit 30. It should be noted that the power unit 28, and the elements included therein, function substantially similar to the elements of the power unit of FIG. 2A. These elements were discussed in detail above and therefore are not discussed in detail below.

The control unit 30, in this preferred embodiment, performs similar functions to the control unit of the embodiment of FIG. 2A. With reference to FIG. 2B, in this preferred embodiment, the control unit 30 includes illumination detection unit 54, timing unit 68, and transistor 80. It should be noted that the timing unit 68, and the elements included therein, as well as the transistor 80, function substantially similar to the elements of the control unit of FIG. 2A. These elements were discussed in detail above and therefore are not discussed in great detail below.

The illumination detection unit 54, as in the previous embodiment, is designed to detect changes in the strength of the sun's radiation. The illumination detection unit 54, in this embodiment, however, includes a photovoltaic cell 56b. The photovoltaic cell 56b is positioned on the surface 14a of the base member 14. The photovoltaic cell 56b directly detects changes in the strength of the sun's radiation. In response to a sufficient reduction of the sun's radiation, the photovoltaic cell 56b initiates the process of illuminating the light sources 20a-f.

Briefly, the photovoltaic cell 56b is an illumination responsive switch. In the daylight, the photovoltaic cell 56b presents a closed circuit having a small resistance. In the darkness, the photovoltaic cell 56b appears as an open having a large resistance. As the amount of the sun's radiation decreases, the resistance of the photovoltaic cell 56b responsively increases. In contrast, as strength of the sun's radiation increases, the resistance of the photovoltaic cell 56b responsively decreases.

The illumination detection unit 54 further includes NOR logic gates 62a-d, capacitor 64, and resistor 66. The NOR logic gates 62a-d, the capacitor 64, and the resistor 66 are employed to responsively generate the reset and trigger signals for the timing unit 68. The output of the NOR logic gate 62c is utilized as the reset signal for the timer 70. The NOR logic gates 62a and 62b, the capacitor 64, and the resistor 66 form a monostable multivibrator whose output pulse is used as the trigger signal for the timer 70. The NOR logic gate 62d provides a signal inversion of the output of the NOR logic gate 62b prior to application to the trigger input of the timer 70 of the timer 70.

As mentioned above, the control unit 30 functions substantially similar to the control unit of FIG. 2A. Only the operation of the transition from light to dark is described below. However, it should be noted that the control unit 30 in this embodiment also performs all of the functions of the control unit of FIG. 2A.

In operation, the resistance of the photovoltaic cell 56b increases during the transition from light to dark. The increase in the resistance of the photovoltaic cell 56b results in an increase in the voltage at the input of the NOR logic gate 62a. once the darkness threshold is met, the input of the NOR logic gate 62a which is coupled to the photovoltaic cell 56b is pulled to a high logic level. The output of the NOR logic gate 62a responsively changes from high to low. The output of the NOR logic gate 62a is coupled to the inputs of the NOR logic gate 62c which changes from low to high. The reset input, pin 4, of the timer 70 is coupled to the output of the NOR logic gate 62c. The reset input of the timer 70 receives the high logic level thereby allowing the timer 70 to respond to the trigger signal subsequently applied to the trigger input of the timer 70.

The output of the NOR logic gate 62a is also coupled to a terminal of the capacitor 64. In response to the high to low transition at the output of the NOR logic gate 62a, the capacitor 64, initially discharged, then begins to charge. During a portion of the charging interval of the capacitor 64, both inputs of the NOR logic gate 62b are at a low logic level. This causes the output of the NOR logic gate 62b to toggle from low to high.

The NOR logic gate 62d receives the high logic level at both its inputs and supplies a logic low to the trigger input, pin 2, of the timer 70. The timing unit 68 has now been triggered and the output of the timer 70, pin 3, provides a base current to the transistor 80, through resistor 76. In response, the transistor 80 turns "on".

The inputs of the NOR logic gate 62c remain low during a portion of the charging time of the capacitor 64. Once the capacitor has charged to approximately 75% of $V_{cc}$ or 4.5 volts, the output of the NOR logic gate 62b toggles low. In response, the output of the NOR logic gate 62d toggles high thereby completing the trigger pulse.

In this embodiment, the darkness threshold is met when the voltage at the input of the NOR logic gate 62a, which is coupled to the photovoltaic cell 56b, causes the output of the NOR logic gate 62a to toggle from high to low. A voltage divider of the photovoltaic cell 56b and the potentiometer 58 dictates when the darkness threshold is met. The resistance of the photovoltaic cell 56b increases during the transition from light to dark. The increase in the resistance of the photovoltaic cell 56b results in an increase in the voltage at the input of the NOR logic gate 62a. The darkness threshold is attained when the input of the NOR logic gate 62a which is coupled to the photovoltaic cell 56b is pulled high. The output of the NOR logic gate 62a responsively changes from high to low. This initiates the illumination process.

In this preferred embodiment, the output of the NOR logic gate 62a changes from high to low at approxmately 75% of $V_{cc}$ or at about 4.5 volts. The potentiometer 58, in a preferred embodiment, has a resistance value of about 5K ohms. The wiper of the potentiometer is adjusted accordingly. Further, since the resistance introduced by the potentiometer 58 may be adjusted, the darkness threshold may be adjusted.

In a preferred embodiment, the NOR logic gates 62a-d are logic gates of an integrated circuit of the type CMOS CD4001 available from Motorola Corporation. The timer 70, in a preferred embodiment, is a LM555 timer manufactured by National Semiconductor, Incorporated. The transistor 80, in a preferred embodiment, is a type 2N2222 transistor available from Motorola corporation. In a preferred embodiment, the diode 56a is a type 1N914 type diode, available from Motorola Corporation. The photovoltaic cell 56b, in a preferred embodiment, is a type J4-805, available from GC Electronics.

The manufacturer specification sheets, commonly known as "Data Sheets", for the device model or type indicated herein are hereby incorporated by reference.

The power and ground pins for the logic gates 62a-d of the integrated circuit are not depicted in FIGS. 2A and 2B. The manufacturer specification sheets for the integrated circuit, as well as the other devices employed to implement the memorial 10, indicate these pins as well as other device requirements.

Figure 3:
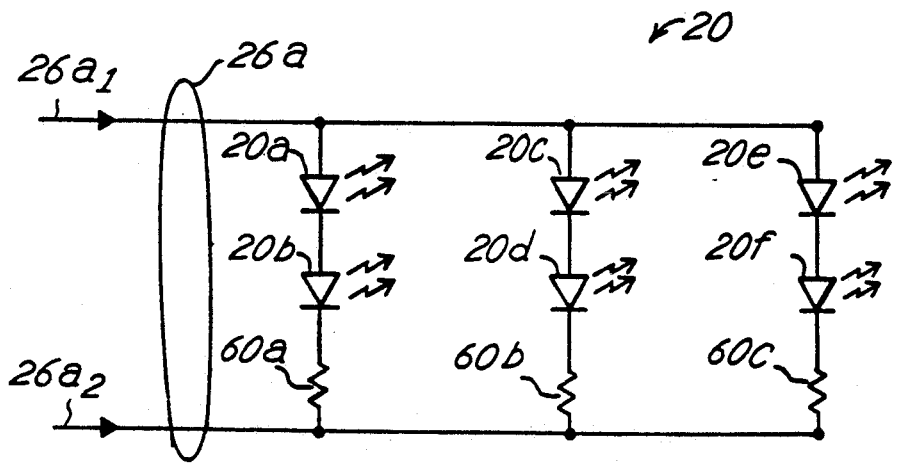
FIG. 3 is a detailed schematic representation of a preferred embodiment of an illumination unit of the memorial of FIG. 1.

With reference to FIG. 3, the illumination unit 20 includes light sources 20a-f and resistors 60a-c. The resistors 60a, 60b, and 60c are designed to limit the current through the light sources 20a-f. The illumination unit 20 couples to the control and power unit 26 over multi-conductors 26a. The anode of each light source 20a, 20c and 20e is coupled to the conductor $26a_1$. The conductor $26a_1$ is the $V_{cc}$ from the control and power unit 26. The cathode of each light source 20a, 20c and 20e is coupled to the anode of each light source 20b, 20d and 20f, respectively. The cathode of each light source 20b, 20d and 20f is coupled to the resistors 60a, 60b, and 60c, respectively. The resistors 60a, 60b, and 60c are coupled to conductor 26a₂ from the control and power unit 26.

The light sources 20a-f, in a preferred embodiment, are light emitting diodes of the type LN21RCHPL manufactured by Panasonic Inc. The resistors 60a, 60b, and 60c, in a preferred embodiment, have a resistance value of about 100 ohms.

Various preferred embodiments of the present invention have been described. It is understood, however, that changes and modifications can be made without departing from the true scope and spirit of the present invention as defined by the following claims, which are to be interpreted in view of the foregoing.

What is claimed is:

1. A memorial comprising, in combination:
   a base member;
   a monument member secured to said base member and made of a substantially translucent material, said monument member having a configuration and an internal cavity substantially conforming to said configuration;
   power means for providing electrical power, said power means including solar panel means for converting solar radiation to electrical energy and a battery interconnected to said solar panel means;
   illumination means for illuminating said monument member in response to electrical power from said power means, said illumination means including at least one light source within said internal cavity, said illumination means, said substantially translucent material, said internal cavity and said power means cooperating to define means for providing a substantially glowing appearance to said monument member;
   timer means for timing a predetermined period and issuing a timing signal at the end thereof;
   low voltage detection means for detecting the level of electrical power provided by said power means and issuing a decoupling signal whenever a predetermined power threshold is met;
   light detection means for sensing ambient light and generating an ambient signal whenever a predetermined darkness threshold is met; and
   control means, coupled to said power means, said illumination means, said timer means, said lower voltage detection means and said light detection means, for interconnecting said power means to said illumination means and initiating said timer means in response to said ambient signal; for disconnecting said power means from said illumination means and resetting said timer means in response to said timing signal; for disconnecting said power means from said illumination means and resetting said timer means in response to termination of said ambient signal during said predetermined period; and for disconnecting said power means from said illumination means in response to said decoupling signal.

2. A memorial as claimed in claim 1 wherein said monument member is adjustably rotatable with respect to said base member, whereby said solar panel means may be orientated to substantially maximize charging of said battery.

3. A memorial as claimed in claim 2 wherein said solar panel means is positioned on said base member.

4. A memorial comprising, in combination:
   a base member;
   a monument member secured to said base member and made of a substantially translucent material, said monument member having a configuration and an internal cavity substantially conforming to said configuration;
   power means for providing electrical power, said power means including solar panel means for converting solar radiation to electrical energy and a battery interconnected to said solar panel means;
   illumination means for illuminating said monument member in response to electrical power from said power means, said illumination means including at least one light source within said internal cavity, said illumination means, said substantially translucent material, said internal cavity and said power means cooperating to define means for providing a substantially glowing appearance to said monument member;
   timer means for timing a predetermined period and issuing a timing signal at the end thereof;
   light detection means for sensing ambient light and generating an ambient signal whenever a predetermined darkness threshold is met; and
   control means, coupled to said power means, said illumination means, said timer means, and said light detection means, for interconnecting said power means to said illumination means and initiating said timer means in response to said ambient signal; for disconnecting said power means from said illumination means and resetting said timer means in response to said timing signal; and for disconnecting said power means from said illumination means and resetting said timer means in response to termination of said ambient signal during said predetermined period.

5. A memorial as claimed in claim 4 wherein said monument member is adjustably rotatable with respect to said base member, whereby said solar panel means may be oriented to substantially maximize charging of said battery.

6. A memorial as claimed in claim 5 wherein said solar panel means is positioned on said base member.

* * * * *